United States Patent Office 3,198,682
Patented Aug. 3, 1965

3,198,682
METHOD OF FORMING A RESILIENT
SURFACE COVERING
Lloyd V. Hassel and Jack H. Witman, East Hempfield
Township, Lancaster County, Pa., assignors to Armstrong Cork Company, Lancaster, Pa., a corporation of
Pennsylvania
No Drawing. Filed Oct. 18, 1960, Ser. No. 63,255
3 Claims. (Cl. 156—298)

This invention relates to a method of producing a resilient surface covering comprised of a wear-resistant surfacing layer bonded to a coated carrier layer. More particularly, this invention relates to a method wherein granules, chips, and sheets of mix containing thermoplastic resins are molded, calendered, laminated, or applied by some other means to various coated carriers, such as painted felt, duck, and burlap, under the influence of heat and pressure to fuse and consolidate the thermoplastic compositions and form a resilient wear-resistant surface.

In making decorative surface-covering sheet materials, such as floor or wall coverings, it is often necessary and desirable to apply one or more coatings to the carrier prior to the application of the decorative wearing surface. Such coatings serve to bond the surface layer to the carrier, to hide and smooth the carrier, and provide background color where the top wearing surface is partly or entirely made up of transparent or translucent surfacing materials. Where discoloration of the carrier sheet or bleeding between layers may occur, the coatings additionally provide hiding power and act as a barrier layer to prevent such bleeding.

In fusing and consolidating granules, chips, and sheets of thermoplastic compositions by molding, calendering, or laminating the compositions to various carriers, such as felt, duck, or burlap, under the influence of heat and pressure, gases are frequently formed and air is often entrapped between the carrier and the particular layer or sheet being deposited thereon. When the thermoplastic layer is in contact with impervious steel belts, coated paper, or steel platens in such forming operations, the generation of gases in the surfacing layer and the entrapment of air frequently results in blistering of the surface layer when the carrier sheet is coated prior to the formation of the resilient surface layer.

The primary object of this invention is to minimize or eliminate blistering during the consolidation and fusion of a wear-resistant, thermoplastic layer to a coated carrier sheet in the production of a resilient surface covering. Ancillary objects of this invention are the minimizing or the eliminating of blistering during such consolidation and fusion by the utilization of novel coating compositions for coating carrier materials.

These and other objects have been accomplished by providing a method of forming a resilient surface covering in which granules, chips, and sheets of thermoplastic compositions are molded, calendered, laminated, or applied by some other means to carrier sheets, such as felt, duck, and burlap, under the influence of heat and pressure, wherein the coated carrier is permeable to any gases or entrapped air formed during the fusion and consolidation of the thermoplastic compositions. This in turn is accomplished by utilizing a coated carrier that has an air permeance greater than 0.3 cubic feet per hour per square foot under a static pressure of 8" of water at a temperature of about 70° F. and relative humidity of about 50%.

The granules or sheets of thermoplastic compositions which are consolidated and fused to form the wear-resistant surface are comprised of thermoplastic resins, plasticizers, pigments, stabilizers, and fillers. Preferably the thermoplastic resins are of the popular vinyl type compositions, such as polyvinyl chloride, copolymers of vinyl chloride and vinyl acetate, and copolymers of vinyl chloride and vinylidene chloride although other thermoplastic resins which will consolidate and fuse to form a resilient wear-resistant surface layer might equally as well be used. Also, sufficient plasticizer is preferably present in the mix to allow the compositions to be readily flowable at the consolidation temperatures employed in consolidating and fusing the wear-resistant surfacing layer to the coated carrier sheets. Pigments, as well as fillers, may be present to achieve the desired decorative effect in the surfacing layer itself and highlighting materials, such as metallic glitter particles, are also contemplated for forming any desired design in the wear surface. The utilization of pure vinyl compositions to form transparent portions of the wear-resistant surface is also contemplated, as well as the use of only sufficient pigment such as to form translucent surfaces through which accent colors in the coating on the carrier itself may be visible. It is also contemplated to form the wear-resistant surfacing layer by consolidating and fusing granules of thermoplastic mix along with chips of preformed thermoplastic material wherein the granules contain sufficient plasticizer to be readily flowable at the consolidation temperature whereas the preformed chips, although slightly deformable at such temperatures, do not flow.

The carriers contemplated are any of the well-known carrier sheet materials used in the fabrication of resilient, decorative wear-resistant surfacing materials, such as asphalt saturated felt, duck, burlap, and beater saturated asbestos sheets.

The coatings, which are applied to the carrier prior to the application of the decorative wearing surfaces, serve as key coats between the carrier and the after-applied wearing surface and act to establish a firm bond throughout the surface covering. These coatings additionally serve to smooth the carrier, provide a background color when the top wearing surface is partially or entirely made up of clears, act as a barrier to prevent bleeding between the wear surface layer and the carrier sheet, and additionally provide hiding power for the carrier and which, depending upon the composition of the wear layer, hide any stains which might occur in the carrier sheet. A wide variety of coating compositions have been found applicable to the practice of this invention as will be shown in the examples wherein specific embodiments of the invention are set forth.

Examples of organosol and plastisol coating formulations, which yield films having a desired degree of porosity when applied to a beater saturated asbestos felt carrier sheet, are illustrated by Examples 1 and 2. In addition to the coatings illustrated by Examples 1 and 2, plastigel coating formulations may equally as well be used. By controlling the time-temperature relationship during the partial fusion of the coatings on the carriers as illustrated in the following examples, air permeance can be carefully and closely controlled so as to achieve optimum properties in the coated carrier. An example of an organosol formulation and the conditions of coating a carrier are as follows:

EXAMPLE 1

Ingredients: Parts by weight
High molecular weight polyvinyl chloride resin powder—
 (Marvinol VR-50) _____ 60.0
 (Marvinol VR-10) _____ 40.0
Octyl polyepoxy stearate (Drapex 4.4) _____ 10.0
Tin-based organic PVC stabilizer (Thermolite 331) _____ 1.5
Dodecyl phthalate (Goodrite EP-266) _____ 25.0
Polyethylene glycol 400 monolaurate _____ 2.0
Calcium carbonate (Atomite) _____ 25.0
TiO$_2$ (R-510) _____ 30.0
Mineral spirits _____ 20.0
Solvesso 150 _____ 5.0
Methyl isobutyl ketone _____ 2.5

This paint formulation was prepared by charging the plasticizers, the tin stabilizer, the polyethylene glycol monolaurate, the titanium dioxide, the Marvinol VR-50, the calcium carbonate, and mineral spirits into a slow-speed, ribbon-blade change can mixer, wherein they are well blended, care being taken to maintain them cool during the mixing. The mass thus prepared is then ground on a 3-roll, water-cooled mill at room temperature to facilitate the complete dispersion of the filler, pigment, and other ingredients in the vehicle. The composition thus prepared is then blended in a mixture of the Marvinol VR-10, Solvesso 150, and methyl isobutyl ketone.

A film from the above-described paint formulation was applied to a standard .039" thick synthetic rubber beater saturated asbestos fiber felt, prepared in accordance with Feigley United States Patent No. 2,759,813, issued August 21, 1956, and fused for 30-40 seconds at 225° F. to yield a film having a thickness of from about .0005"-.001". The coated felt was then tested to determine the air permeance using a Brooks Rotameter air-flow apparatus. The samples tested were sealed to a plenum chamber with a wax sealant, the chamber was attached to the air-flow apparatus, and readings were taken at intervals of 1" H$_2$O static pressure until a static pressure of 8" of water was reached. The material was pre-conditioned and tested at 70° F. and 50% relative humidity. The samples tested showed an air permeance equal to 1.2-1.6 cubic feet per hour per square foot under a head of 8" of water. The coated felt, on fluxing the coating film under pressures of 1,000-1,400 p.s.i. at a temperature of 250°-350° F. or by heating at 300°-350° F., had an air permeance which was practically nil or less than 0.08 cubic feet per hour per square foot under a head of 8" of water.

The following is an example of a plastisol paint composition which, when mixed and applied to the standard felt in accordance with the procedure of Example 1 and fused for 30-40 seconds at 225° F. to yield a film having a thickness of from .0005"-.001", yielded a coated felt having an air permeance equivalent to the coated felt prepared in accordance with Example 1.

EXAMPLE 2

Ingredients: Weight in grams
High molecular weight polyvinyl chloride resin powder—
 (Marvinol VR-50) _____ 60.0
 (Marvinol VR-10) _____ 40.0
Epoxidized soya oil (Paraplex G-62) _____ 5.0
Dodecyl phthalate _____ 20.0
Tin-based organic PVC stabilizer (Thermolite 31) _____ 1.5
Polyethylene glycol 400 monolaurate _____ 2.0
Mineral spirits _____ 15.0

Coated beater saturated rubber-asbestos carrier sheets, prepared in accordance with the procedures of Examples 1 and 2 and having air permeances in the range of 1.2-1.6 cubic feet per hour per square foot under a head of 8" of water, were used in preparing floor products in accordance with the following example.

EXAMPLE 3

The following formula provides a composition suitable for use in the formation of vinyl chips, all parts being given by weight:

Ingredients: Parts by weight
Vinyl chloride-vinyl acetate copolymer resin with 2-3% vinyl acetate, specific viscosity 0.20 (Vinylite VYNW, calculated average molecular weight about 22,500) _____ 29.16
Dioctyl phthalate _____ 9.27
Epoxidized soya bean oil (Paraplex G-62) __ 1.30
Barium-cadmium soap plus an organic inhibitor as a stabilizer for the resin (Ferro 1825) _____ 0.91
Ground limestone filler _____ 57.80
Pigment _____ 1.56

In the preparation of the chips, the materials are combined on a 2-roll rubber mill and sheeted off as a calendered ribbon about 10" wide and .070" thick. This ribbon is then cooled and severed into chips of the appropriate size. The chips are then disposed onto the coated carrier sheet, and the carrier sheet is then fed over a vibrator which causes the chips to slide relative to one another over their faces and become disposed flatwise in a single layer and also causes them to move laterally into contact with one another.

The vinyl chips are then keyed to the backing layer or carrier sheet by passing the carrier sheet through an infrared oven to soften the vinyl chips and the coating, after which the heated material is engaged by a pair of rolls which apply sufficient pressure to the chips and the carrier sheet to key the chips to the carrier sheet.

A dry powdered matrix material is then delivered onto the surface of the backing and over the vinyl chips. The matrix is of the following composition, all parts being by weight:

Ingredients: Parts by weight
Polyvinyl chloride homopolymer, specific viscosity 0.12 (Vinylite QYSA) _____ 74.58
Dioctyl phthalate _____ 19.13
Epoxidized soya bean oil (Paraplex G-62) __ 3.95
Stabilizer (Ferro 1825) _____ 2.33
Pigment _____ .01

The matrix material is prepared by compounding the powdered resin with the plasticizer and stabilizer after which mild heat is applied to cause the plasticizer and stabilizer to be diffused throughout the resin particles. The resultant particles are in the form of a fine powder passing a sieve size of 20 mesh or finer.

A rotary brush is used to distribute the powdered matrix material into the areas between the individual chips and to remove any excess powder from the surface of the chips after which the carrier sheet carrying the vinyl chips and matrix material is passed beneath radiant heaters which heat the powder and chips to the desired temperature for consolidation in a flat-bed press. With the backing, vinyl chips, and matrix materials above described, the mean temperature at the face of the sheet as it leaves the heater may be about 300° F. The flat-bed press comprises an upper platen which is heated to a temperature of about 350° F. and a lower press platen which is not heated. A pressure of about 1,400 pounds per square inch is applied in the flat-bed press to provide a consolidated floor product having a thickness of about .090", the temperature at the face of the material being elevated to about 340° F. before opening the press. The final thickness of .090" results from the consolidation of a carrier sheet .039" thick and vinyl chips having an average thickness of about .070", the chips averaging about .058" thick after final consolidation and formation of the finished product.

Utilizing carrier sheets prepared as described in Examples 1 and 2, the flat-bed press process above described produces an entirely satisfactory resilient floor covering and there was no evidence of blistering in the wear-resistant surface layer. Where, however, a coated carrier sheet having an air permeance of less than 0.3 cubic feet per hour per square foot under a static pressure of 8" of water was used in forming a floor product in accordance with Example 3, i.e., where the coated carrier sheet had an air permeance of approximately 0.1 cubic foot per hour per square foot under a head of 8" of water, serious blistering problems were encountered in the wear-resistant surfacing layer and products prepared using such carrier sheets were unacceptable.

Although Example 3 illustrates the method of this invention utilizing chips and granules of thermoplastic composition for forming the wear surface of the resilient surface covering, it will be readily evident that the use of the carrier sheets of Examples 1 and 2 will be equally as well adaptable to a method wherein granules or sheets of thermoplastic composition are fused and consolidated to produce the wear-resistant surfacing layer.

Satisfactory paint formulations yielding a porous film when utilized in coating carrier sheets have been achieved by increasing the ratio of pigment and filler to binder. Average paints usually have a pigment volume concentration or PVC in the range of 30%–55% and, generally speaking, paints with higher values of PVC have poor physical properties for usual purposes, the amount of pigment then approaching or exceeding the critical pigment volume concentration which is about 51.75%, based upon present industrial figures. We have found that by utilizing a system with a pigment volume concentration of 55%–80%, the entire range being above the critical pigment volume concentration, high porosity, along with very satisfactory physical properties, can be obtained in the coated carrier sheet. Increased porosity could be obtained by filling the paint even further but eventually other properties, such as keying ability, become unsatisfactory.

The following example sets forth a paint formulation having a pigment volume concentration of 69.5%:

EXAMPLE 4

| Ingredients | Batch, lbs. | Percent by weight | Solids by weight, lbs. | Solids by volume, gal. |
|---|---|---|---|---|
| Polyvinyl acetate-acrylic copolymer latex, 43% solids (Resyn 2203) | 143.5 | 25.21 | 61.75 | 6.45 |
| Commercial defoamer containing fatty acids (Balab 259) | 3.1 | .54 | | |
| Nonionic isooctyl phenyl polyethoxy ethanol (Triton X-100) | 1.4 | .25 | | |
| Anionic sodium salt of a carboxylated electrolyte (Tamol 731) | 9.4 | 1.66 | | |
| Pigment (TiO$_2$) | 113.4 | 20.00 | 113.4 | 3.24 |
| Limestone | 181.7 | 31.90 | 181.7 | 8.05 |
| Iceberg clay (a calcined clay) | 75.7 | 13.32 | 75.7 | 3.48 |
| Water | 40.4 | 7.12 | | |

This paint formulation represents a typical aqueous paint system except for the high amount of filler relative to the binder content. Solvent systems have been found operative in the same manner, the PVC being maintained between 55%–80%. Other binders and other fillers, such as finely divided foams or cork, could be substituted for all or part of the binder or fillers set forth in the formulation above.

This paint was used to roll coat a synthetic rubber beater saturated asbestos fiber felt with a wet film 1½ to 2½ mils thick, and the coated felt thus produced when dried was used in forming a floor product in accordance with the procedure set forth in Example 3. The coated felt had an air permeance of about 1.6 cubic feet per hour per square foot under a static pressure of 8" of water at about 70° F. and at a relative humidity of about 50%. The resilient surface coverings produced utilizing the coated carrier sheet were entirely satisfactory and showed no signs of blistering.

A second paint formulation was made up as above described except that twice as much polyvinyl acetate-acrylic copolymer latex binder was used, the other ingredients and quantities remaining the same. A synthetic rubber beater saturated asbestos fiber felt was roll coated with a 1½ to 2½ mil thick (wet) paint film, 20 pounds wet paint per 100 square yards, containing this higher binder ratio, and the resulting carrier sheet when dried had an air permeance of less than 0.3 cubic feet per hour per square foot under a static pressure of 8" of water at about 70° F. and at a relative humidity of about 50%. When the coated carrier was used in producing floor coverings in accordance with the procedure set forth in Example 3, the resultant floor products showed blistering in the surfacing layer and were unsatisfactory in appearance.

EXAMPLE 5

This example illustrates a typical formula of a paint containing a two-component binder system, the second component being a powdered resin which is activatable only at the pressures and temperatures achieved during the fusion and consolidation of the wear-resistant layer.

| Ingredients | Batch, lbs. | Percent by weight | Percent solids by weight |
|---|---|---|---|
| Polyvinyl acetate-acrylic copolymer latex, 43% solids (Resyn 2203) | 143.5 | 22.75 | 12.50 |
| Commercial defoamer containing fatty acids (Balab 259) | 3.1 | .49 | |
| Nonionic isooctyl phenyl polyethoxy ethanol (Triton X-100) | 1.4 | .22 | |
| Anionic sodium salt of a carboxylated electrolyte (Tamol 731) | 9.4 | 1.48 | |
| Pigment (TiO$_2$) | 113.4 | 18.00 | 22.95 |
| Limestone | 181.7 | 28.82 | 36.73 |
| Iceberg clay (a calcined clay) | 75.7 | 12.00 | 15.32 |
| Water | 40.4 | 6.42 | |
| Ethyl methacrylate polymer powdered resin (Lucite 42) | 61.8 | 9.82 | 12.50 |

The water, Triton X-100, and Tamol 731 were charged into the mixing tank and agitation started. The polyvinyl acetate-acrylic copolymer latex and the Balab 259 were then added after which the Iceberg clay was sifted in and mixed until well dispersed. The pigment and limestone were sifted in and mixed and finally the ethyl methacrylate powdered resin was added, the mixture being continually agitated to assure good dispersion of all the pigment fillers and resin.

The paint thus prepared was applied to a synthetic rubber beater saturated asbestos fiber felt using a forward-type roll coater at an application rate of 15–25 pounds of wet paint per hundred square yards of felt. The coated sheet was then dried in a convection-type oven at a temperature such that the temperature of the paint reached approximately 200°–250° F. The coated carrier was then used in the preparation of a floor product in accordance with the procedure of Example 3. A floor product having a satisfactory wearing surface was achieved and there was no evidence of blistering. Under the conditions of temperature and pressure achieved during the formation of the wear-resistant surface layer, the ethyl methacrylate powdered resin was caused to flow and became an effective part of the binder system.

This paint formulation represents an aqueous system with a solvent-soluble polymer dispersed therein. It is contemplated that a solvent-based system could be used equally as well, the solvent-soluble resin being replaced by a resin which is not soluble in the dispersing medium. In this formulation, the ratio of the polyvinyl acetate-acrylic copolymer latex to the ethyl methacrylate powdered resin was adjusted to equal parts of each. This, of course, could be adjusted to give the desired porosity or other physical properties in the vinyl film. Other fillers and pigments could be used to replace all or part of the fillers or pigments set forth in this formulation.

Generally speaking, it has been found that satisfactory porous films are achieved with formulations comprised of 5–60 parts by weight of an organic film former which is activatable at a low drying temperature, 5–60 parts by weight of an organic film former which is activatable at the higher temperature during consolidation and fusion of the vinyl wear layer, and from 30–90 parts by weight of filler and pigment. It such formulations, the various ingredients are adjusted to give a paint film having an air permeance greater than 0.3 cubic foot per hour per square foot under a static pressure of 8″ of water at 70° F. and at a relative humidity of 50%. The two-binder component system has additional advantages insofar as higher ratios of binder to filler may be utilized in formulating the paints, thus providing a greater degree of bonding between the carrier and the wear surface upon fusion and consolidation of the thermoplastic composition utilized in forming the wear surface.

A further paint of this type is illustrated by the following example which describes a paint formulation containing two types of latex binder, one latex binder fusing without application of heat or at a relatively low temperature while the second latex binder requires a relatively high temperature to coalesce the particles. The paint formulation contains a sufficient amount of the first latex to provide an initial adhesion of the decorative wear layer while the final firm adhesion is achieved through the activation of the second latex binder during the fusion and consolidation step.

EXAMPLE 6

| Ingredients | Percent by weight | Percent solids by weight |
| --- | --- | --- |
| Polyvinyl acetate-acrylic copolymer latex, 43% solids (Resyn 2203) | 19.61 | 12.50 |
| Commercial defoamer containing fatty acids (Balab 259) | .42 | |
| Surfactant (Triton X-100) | .19 | |
| Surfactant (Tamol 731) | 1.28 | |
| Pigment (TiO₂) | 15.51 | 22.95 |
| Limestone | 24.90 | 36.73 |
| Iceberg clay (a calcined clay) | 10.35 | 15.32 |
| Water | 5.54 | |
| Acrylic latex, 38% solids (Rhoplex B-85) | 22.20 | 12.50 |

The water and surfactants were charged into a mixing tank and agitation started. Both resins, along with the Balab 259, were then added after which the Iceberg clay was sifted in and mixed until well dispersed. Next, the pigment was sifted in and mixing was continued for approximately twenty minutes after which the limestone was sifted in and agitation continued for another ten minutes to assure adequate dispersion of all the pigment and fillers.

This paint may be applied to the carrier sheets, such as the synthetic rubber beater saturated asbestos fiber felt, by any of a number of methods, such as forward or reverse roll coating, spraying, or by knife or doctor blade coaters. Preferably a minimum of approximately 15 pounds of wet paint per hundred square yards of asbestos fiber felt is necessary to adequately hide the carrier, and a maximum of approximately 70 pounds should suffice to hide as well as present a smooth surface to the rough-surface carrier while still maintaining the desired porosity in the coated carrier. The drying cycle of the coated carrier is dependent upon the amount of paint applied but, in general, the temperature of the paint surface should not exceed 225° F.

The final wearing surface, such as vinyl chips or a vinyl film, may be applied to the coated carrier and fused thereon at temperatures ranging from 350°–475° F. under pressures of from 400–1,300 pounds per square inch. Under these conditions, the acrylic latex coalesces and functions as an effective binder to enhance the binding action of the polyvinyl acetate-acrylic copolymer latex.

A .039″ thick synthetic rubber beater saturated asbestos fiber felt reverse roll coated with the above-described paint at a rate of approximately 40–60 pounds wet paint per hundred square yards of felt and then dried at 190° F. yielded a coated carrier sheet having an air permeance of from 1.7–2.2 or an average air permeance of 1.9 cubic feet per hour per square foot under a static pressure of 8″ of water measured at 70° F. and at a relative humidity of 50%. Floor coverings produced in accordance with Example 3 using this coated carrier resulted in satisfactory products in which no blistering was encountered in the wear-resistant surfacing layer.

At the temperature at which the coated carrier was initially dried, the acrylic latex remained as discrete particles dispersed in the primary polyvinyl acetate-acrylic copolymer latex binder. Upon the consolidation and fusion of the decorative layer, the acrylic latex became activated thus lowering the ratio of binder to filler in the paint composition to 1:3 from a binder to filler ratio of 1:6 initially. Thus, a firm, permanent bond is established during the fusion and consolidation step in the preparation of the decorative surface covering. During the fusion and consolidation step, the paint layer retains a desired degree of porosity so that gases formed during fusion readily pass through the paint layer and through the carrier layer thus insuring against blistering. Although an acrylic latex was described as being the high temperature activated binder component of the above-described paint formulation, other high temperature activated resins may be substituted in whole or in part for the acrylic latex. In this paint system, the ratio of one binder component to the other predetermines the temperature at which complete fusion occurs and, up to this temperature, the degree of porosity of the film itself is directly dependent upon the temperature obtained, and the porosity of the film is thus easily controlled within wide limits.

It is additionally contemplated that a blowing agent, which will decompose or expand during the drying step, during a separate heating step following the actual drying step or during the fusion and consolidation step, may be incorporated into the paint formulation to provide a coating on the carrier sheet which is permeable to gases formed during the fusion and consolidation of the wearing surface. Preferably the paint formulations containing a blowing agent are comprised of from 10–70 parts by weight of an organic film-forming material, from 30–90 parts by weight of filler and pigment, and from ½%–10% by weight of a blowing agent on a dry weight basis.

The following example is given by way of illustration of one specific embodiment of the use of a blowing agent to yield a coating with a controlled degree of porosity.

EXAMPLE 7

Using standard paint mixing techniques, a paint was prepared having the following formulation:

| Ingredients: | Weight (pounds) |
| --- | --- |
| Water | 106.0 |
| 2% solution of hydroxyethyl cellulose in water | 42.6 |
| Surfactant (Triton X-100) | 3.4 |
| Surfactant (Tamol 731-25%) | 23.3 |
| Calcined clay | 187.5 |
| Polyvinyl acetate-acrylic copolymer latex- 43% solids (Resyn 2203) | 712.5 |
| Defoamer (Balab 259) | 7.8 |
| Pigment (TiO₂) | 281.0 |
| Limestone | 450.0 |

To prepare a paint containing a blowing agent, 73.3 pounds of Celogen, p,p′-oxybis-(benzenesulfonyl hydrazide), was blended into the paint above described by adding the Celogen to the paint and stirring to form a homogeneous blend. To evaluate the porosity of the coated felts, a series of determinations of air flow through various felts coated with the above paint formulation, both with and without Celogen, were made, the air permeance test in accordance with the procedure outlined under Example 1, all air flow measurements being made on the fused products. The results are set forth in Table I. The air flows or air permeances reported are cubic feet per hour per square foot under a static pressure of 8" of water, and the range of several samples is given.

Table I

| Air permeance of felt | Regular paint [1] | Paint containing Celogen [2] |
|---|---|---|
| (1) 11.3–12.5: | | |
| Dry film thickness (mils) | 1.0–1.2 | 1.8–2.5 |
| Air permeance | 0.21–0.33 | 0.6–1.5 |
| (2) 16.1–18.8: | | |
| Dry film thickness (mils) | 1.9–2.5 | 2.3–2.8 |
| Air permeance | 0.22–0.24 | 0.71–1.5 |
| (3) 15.1–16.1: | | |
| Dry film thickness (mils) | 2.1–2.8 | 2.5–3.4 |
| Air permeance | 0.10–0.24 | 0.52–0.67 |
| (4) 7.1–7.8: | | |
| Dry film thickness (mils) | 2.3–3.1 | 2.3–2.5 |
| Air permeance | 0.20–0.21 | 0.33–0.54 |

[1] Air dried and stoved 10 minutes at 180° F.
[2] Air dried and stoved 1 minute at 350° F. All coatings applied by doctor coating with a wire-wound coating rod.

As is clearly shown by the foregoing results, the Celogen containing paint results in a thicker, more porous film. Table I also shows that the porosity of the coating film governs air flow through the sample, noting the varied porosities of base felts which were coated. In each instance, floor products produced in accordance with Example 3 from the felts coated with the Celogen containing paints gave satisfactory products whereas the use of felts coated with the paint without Celogen resulted in unsightly blistering.

As blowing agents, such nitrogen-containing materials as p.p'-oxybis-(benzenesulfonyl hydrazide) (Celogen), azodicarbonamide (Celogen AZ), and NN' dimethyl, NN' dinitrosoterephthalamide (BL–353), and inorganic materials, such as ammonium bicarbonate, may be used. These agents may be incorporated into the coating system by grinding into a plasticizer to yield a dispersion which can then be added to the binder system, they may be stirred directly into a non-aqueous system, in an aqueous system they may be dispersed in the plasticizer which would then be emulsified and added to the water-based binder system, and also in aqueous systems the blowing agent could be dispersed in the plasticizer and then, in some cases, stirred directly into a water system without pre-emulsifying the plasticizer blowing agent dispersion. The enumerated methods of incorporating the blowing agent are by way of example for purposes of illustration only, and it is conceivable that several methods might be readily used for incorporating the blowing agents into the paint formulations to yield a porous coating.

Although the foregoing examples are primarily illustrative of paint formulations which on drying yield a film which is permeable to gases formed during the fusion and consolidation of the after-applied thermoplastic wear layer, it is contemplated that relatively impervious films may be used, the carrier coated with the relatively impermeable film being subsequently made porous by mechanical methods, such as needle punching the film, to form a film having a desired degree of porosity. Such mechanical methods, although they would yield coated carrier sheets having the desired porosity, suffer from a disadvantage insofar as an extra step and extra equipment would be required in the production of resilient surface coverings.

It is also contemplated that a coated carrier having the desired porosity could be achieved by applying a discontinuous film to the carrier sheet by printing thereon. It might well be very difficult to obtain a satisfactory coating by this method because exceedingly close tolerances would have to be met to achieve the porosity desired together with the required hiding power and other physical characteristics, such as the keying ability of the coating.

We claim:

1. In a method of producing a resilient surface covering having a continuous thermoplastic wear layer bonded to a carrier coated with a continuous thermoplastic resin-containing coating composition, wherein gases are formed during the consolidating and fusing of the thermoplastic resin-containing composition which forms said wear layer, the improvement which comprises coating a carrier with a paint containing an organic film former which is activated at a low temperature and an organic film former which is activated at a relatively high temperature, subjecting said coated carrier to a temperature at which the solvent is evaporated and the organic film former activatable at a low temperature is activated to form a coated carrier having an air permeance greater than about 0.3 cubic foot per hour per square foot under a static pressure of 8" of water at a temperature of about 70° F. and at a relative humidity of about 50%, disposing a thermoplastic resin-containing composition on the coated surface of said carrier, and consolidating and fusing said thermoplastic composition under heat and pressure to form a wear-resistant surface bonded to said carrier and to activate the second organic film-forming component.

2. The method as defined in claim 1 in which the paint composition is comprised, on a dry weight basis, of 5–60 parts by weight of an organic film former activatable at a low temperature, 5–60 parts by weight of an organic film former activatable at a relatively higher temperature, and from 30–90 parts by weight of inorganic filler and pigment.

3. In a method of producing a resilient surface covering having a continuous thermoplastic wear layer bonded to a carrier coated with a continuous thermoplastic resin-containing coating composition, wherein gases are formed during the consolidating and fusing of the thermoplastic resin-containing composition which forms said wear layer, the improvement which comprises initially coating said carrier with a coating containing a member selected from the class consisting of organosols, plastisols, and plastigels, and partially fusing said coating to give a coated carrier having an air permeance greater than about 0.3 cubic foot per hour per square foot under a static pressure of 8" of water at a temperature of about 70° F. and a relative humidity of about 50%, disposing a thermoplastic resin-containing composition on the coated surface of said carrier, and consolidating and fusing said thermoplastic composition under heat and pressure to form a wear-resistant surface bonded to said carrier.

References Cited by the Examiner

UNITED STATES PATENTS

| 2,617,750 | 11/52 | Le Clair et al. | 154—47 |
| 2,798,820 | 7/57 | Nelson | 117—135.5 |
| 2,894,855 | 7/59 | Wilhelm | 117—135.5 |

EARL M. BERGERT, *Primary Examiner.*

CARL F. KRAFFT, *Examiner.*